United States Patent [19]

Warren et al.

[11] Patent Number: 5,102,937

[45] Date of Patent: Apr. 7, 1992

[54] GLASS ADHESIVE

[75] Inventors: Patrick A. Warren; William S. Pfister, both of Erie; Mark A. Weih, Cambridge Springs, all of Pa.

[73] Assignee: Lord Corporation, Erie, Pa.

[21] Appl. No.: 587,275

[22] Filed: Sep. 24, 1990

[51] Int. Cl.$^5$ .............................................. C08L 75/04
[52] U.S. Cl. .................................. 524/261; 156/331.4; 156/331.7; 428/424.6
[58] Field of Search ..................... 524/261; 156/331.4, 156/331.7; 428/424.6

[56] References Cited

U.S. PATENT DOCUMENTS

| | | | |
|---|---|---|---|
| 3,362,843 | 1/1968 | Smith et al. | 117/72 |
| 3,666,539 | 5/1972 | Kiel | 117/124 F |
| 3,734,763 | 5/1973 | Piueddemann | 117/72 |
| 3,998,985 | 12/1976 | Kitaj | 427/386 |
| 4,595,718 | 6/1986 | Allen et al. | 523/434 |

Primary Examiner—Maurice J. Welch
Attorney, Agent, or Firm—W. Graham Buie

[57] ABSTRACT

A chemical formulation useful as a coating, primer or adhesive including a linear polyester polyurethane, a halogenated polyolefin, an alkoxy silane compound, and a cross-linker. The formulation is preferably utilized as a two-component adhesive for bonding vinyl polymers such as polyvinyl chloride to various substrates such as glass.

18 Claims, No Drawings

GLASS ADHESIVE

FIELD OF THE INVENTION

This invention relates to the bonding of glass to elastomeric materials. More specifically, the present invention is an improved adhesive composition which is capable of providing high-strength and environmentally-resistant bonds between certain elastomeric compositions such as vinyl chloride polymers and a glass substrate.

BACKGROUND OF THE INVENTION

The bonding of elastomeric materials such as polyvinyl chloride to a glass substrate is well known and is utilized in many industries involving devices which require the interface of an elastomeric material and glass parts or components. The vinyl chloride polymer, or other elastomer, is typically injection molded or applied as a hot melt to a glass substrate that has been coated with an appropriate adhesive. In many applications, in order to obtain an effective bond between the elastomer and glass surface, preheating of the adhesive after application to the glass surface is required.

One application, which is gaining popularity and represents a new concept in automotive design, is the production of modular windows. Modular windows can significantly reduce the drag coefficient of an automobile which employs such a window. Modular windows are prepared by a one-step molding process wherein the edge of a glass component is bonded within a polymeric gasket. The polymeric gasket is typically made of a material such as reaction injection molded (RIM) urethane or polyvinyl chloride.

One example of an effort to improve the adhesion of vinyl polymers to glass surfaces is disclosed in U.S. Pat. No. 3,998,985 which relates to the incorporation of certain polyaminosilane compounds within the vinyl polymer to be bonded. Specifically, the vinyl polymer is mixed with a combination of a polyaminosilane and a primer which contains an epichlorohydrin-bisphenol A resin, N-aminoethyl-gamma-aminopropyltrimethoxysilane, ethyleneglycolmonomethyl ether, and ethyleneglycolmonoethylether acetate.

Further examples of vinyl polymer-glass adhesives are disclosed in U.S. Pat. No. 3,666,539, which discloses epoxy reactive silanes which act as coupling agents for adhering various polymers to glass; U.S. Pat. No. 3,362,843, which discloses a mixture of an aminoalkylalkoxysilane and an epoxy resin-methyl methacrylate primer; and U.S. Pat. No. 3,734,763, which discloses the use of N-[beta-(N'-paravinylbenzyl)-aminoethyl]-gamma-aminopropyltrimethoxysilane hydrochloride as a vinyl polymer-glass coupling agent.

Although previously developed vinyl polymer-glass adhesives such as those disclosed above work reasonably well in certain applications, it would be desirable to develop a vinyl polymer-glass adhesive which would be particularly adaptable to applications involving the production of modular windows. Such an adhesive should be capable of providing a weather-resistant bond without the requirement of preheating the adhesive-coated glass surface prior to bonding of the elastomeric material.

SUMMARY OF THE INVENTION

The present invention is a vinyl polymer-glass adhesive that has been shown to provide excellent environmental resistance without the requirement of a preheating step. Specifically, the invention is a two-component adhesive which provides vinyl polymer-glass adhesive bonds that will withstand extended exposure to water and/or high temperatures. Preheating of the adhesive of the present invention is not required in order to achieve excellent adhesion between the elastomeric substrate and the glass surface.

The first component of the present invention contains a linear polyester polyurethane, a halogenated polyolefin, and an alkoxy silane compound. The second component of the invention is a cross-linking compound for cross-linking the first component of the adhesive. The two components are stored separately, and prior to application to a substrate, the components are thoroughly mixed together. After coating the substrate, the vinyl polymer is typically applied to the coated substrate in the form of a molten material, such as is carried out in a typical injection molding process. Vinyl polymer-glass bonds prepared in this manner with the adhesive of the present invention exhibit excellent primary adhesion between the bonded surfaces and demonstrate unusually high water resistance. Vinyl polymer-glass bonds prepared in accordance with the invention also perform well in high temperature environments.

DETAILED DESCRIPTION OF THE INVENTION

The adhesive composition of the present invention contains two components which can be applied between a vinyl polymer and a glass substrate under bonding conditions in order to produce an exceptionally high strength, water- and heat-resistant adhesive bond.

The first component of the present invention comprises a linear polyester polyurethane, a halogenated polyolefin and an alkoxy silane compound. The linear polyester polyurethanes which are an essential element of the invention are typically prepared by reacting isocyanate-functional urethane polyester prepolymers with low molecular weight chain extending diols employing conventional techniques well known in the art. An extensive description of some of the useful techniques for preparing polyester urethane prepolymers can be found in Saunders and Frisch: "Polyurethanes, Chemistry and Technology," Part II, Interscience, (New York 1964), especially at pages 8 to 49, and in the references cited therein. Other preparative techniques which are known in the art can also be employed.

More specifically, the linear polyester polyurethanes which can be employed in the adhesive compositions of the present invention typically are prepared by reacting at least one linear polyester having two active hydrogen atoms with a diisocyanate in order to form an isocyanate-functional urethane polyester prepolymer. The urethane polyester prepolymer is then reacted with a low molecular weight chain extending diol in order to prepare the linear polyester polyurethane useful in the present invention.

The hydrogen atom-containing linear polyesters used to produce the polyurethanes of the invention are generally hydroxy-terminated polyesters having an average molecular weight in the range from about 500 to 4000. The linear polyesters are typically formed from bifunctional monomers having either aliphatic or aromatic segments therein. For example, the linear polyesters may be formed by reacting dihydric alcohols with polycarboxylic acids in hydroxyl:carboxyl ratios ranging from 2:1 to 15:14. Exemplary linear polyesters useful for forming the polyurethanes of the invention include condensation products of succinic acid, adipic acid, suberic acid, azelaic acid, sebacic acid, phthalic acid, isophthalic acid or terephthalic acid acid with difunctional hydroxy compounds such as ethylene glycol, diethylene glycol, 1,4-butane diol, 1,3-propane diol, 1,6-hexane diol, poly(ethylene oxide) diol, poly(ethylene oxide/propylene oxide) diol and poly(tetramethylene oxide) diol in various combinations well known in the art. Presently preferred active hydrogen-containing linear polyesters include 1,6-hexane diol phthalate polyester diol, 1,6-hexane diol adipate diol, and 1,6-hexane diol ethylene glycol adipate diol. Lactone-based polyester polyols, prepared according to methods known in the art by reacting a lactone such as caprolactone with a difunctional hydroxy compound as defined immediately above, may also be utilized in the present invention.

Any of the diisocyanates having two reactive isocyanate groups can be reacted with the linear polyester in order to create the isocyanate-functional urethane polyester prepolymers suitable for use in the practice of the invention. Such diisocyanates include, without limitation, diisocyanates such as 1,6-hexamethylene diisocyanate; 1,8-octomethylene diisocyanate; 1,12-dodecamethylene diisocyanate; 2,2,4-trimethylhexamethylene diisocyanate and similar isocyanates; 3,3'diisocyanatodipropyl ether; 3-isocyanatomethyl-3,5,5'-trimethylcyclohexyl isocyanate; cyclopentalene-1,3-diisocyanate; cyclohexylene-1,4-diisocyanate; methyl 2,6-diisocyanatocaprolate; bis-(2-isocyanatoethyl)-fumarate; 4-methyl-1,3-diisocyanatocyclohexane; trans-vinylene diisocyanate and similar unsaturated polyisocyanates; 4,4'-methylene-bis-(cyclohexylisocyanate) and related polyisocyanates; methane diisocyanates; bis-(2-isocyanatoethyl) carbonate and similar carbonate polyisocyanates; N,N'N''-tris-(6-isocyanatohexamethylene) biuret and related polyisocyanates as well as other known polyisocyanates derived from aliphatic polyamines; toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; tris(4-isocyanatophenyl) methane; naphthalene diisocyanates; 4,4'-biphenyl diisocyanate; phenylene diisocyanates; 3,3'-dimethyl-4,4'-biphenyl diisocyanate; p-isocyanatobenzoyl isocyanate and tetrachloro-1,3-phenylene diisocyanate and mixtures thereof. Preferred diisocyanates include toluene diisocyanate and diphenylmethane-4,4'-diisocyanate.

The urethane polyester prepolymer is reacted with low molecular weight chain extending diols as is known in the art to produce the final linear polyester polyurethane of the invention. Typical chain extending diols include 1,4-butane diol, ethylene glycol, diethylene glycol, 1,3-propane diol and 1,6-hexane diol.

Generally, the polyurethane employed in the practice of this invention has a molecular weight of at least 50,000, but preferably has a molecular weight greater than 100,000. At the present time, the preferred linear polyester polyurethanes are prepared by reacting a linear polyester with toluene diisocyanate and chain extending the prepolymer thus formed with 1,4-butane diol. The urethane preferably has a hydroxyl content of between about 0.08 and 0.12 percent and a solution viscosity (15% by weight in methyl ethyl ketone) of between about 400 and 800 centiposes. The linear polyester polyurethane is utilized in an amount from about 10 to about 99, preferably from about 60 to about 80 percent by weight of the first component.

The halogenated polyolefin of the first component can essentially be any natural or synthetic halogenated polyolefin elastomer. The halogens employed in the halogenated polyolefinic elastomers are typically chlorine or bromine, although fluorine can also be used. Mixtures of halogens can also be employed in which case the halogen-containing polyolefinic elastomer will have more than one type of halogen substituted thereon. The amount of halogen does not appear critical and can range from as low as about 3 weight percent to more than 70 weight percent, depending on the nature of the base elastomer or polymer. Generally, the halogenated polyolefin has an inherent viscosity above 100 centipoise at 20% concentration in toluene and a halogen content of 58 to 65% by weight. Halogenated polyolefins and their preparation are well-known to those skilled in the art.

Representative halogenated polyolefins include chlorinated natural rubber, chlorine- and bromine-containing synthetic rubbers and halogenated polymers derived from dienes having from 4 to 8 carbon atoms. Typical halogenated polyolefins include polychloroprene, chlorinated polychloroprene, chlorinated polypropylene, chlorinated polybutadiene, chlorinated polyisoprene, halogenated polybutylene, halogenated polyhexadiene, chlorinated butadiene styrene copolymers, chlorinated ethylene propylene copolymers and ethylene/propylene/non-conjugated diene terpolymers, chlorinated polyethylene, chlorosulfonated polyethylene, halogenated copolymers of dissimilar α-olefins of 2 to 8 carbon atoms, chlorinated poly(vinyl chloride), and the like, including mixtures of such halogen-containing elastomers. The halogenated polyolefin of the first component can also be halogenated vinyl halide polymers including halogenated homopolymers or copolymers of vinyl halide. These halogenated materials can be made by post-halogenating the vinyl-halide resin, preferably by post-chlorinating polyvinylchloride. Such materials are commercially available and include, for instance, Genchlor S and Genchlor T, manufactured by Imperial Chemical Industries, Ltd.

Thus, substantially any of the known halogen-containing derivatives of natural and synthetic elastomers can be employed as the halogenated polyolefin in the practice of this invention, including mixtures of such elastomers. At the present time, chlorinated polyisoprene is the preferred halogenated polyolefin for use in the present invention. The polyolefin is normally utilized in an amount from about 0.2 to about 60 percent by weight, preferably from about 15 to about 30 percent by weight of the first component.

The alkoxy silane compounds of the present invention correspond to the general formula:

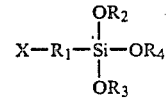

wherein $R_1$ is a divalent aliphatic hydrocarbon residue having 1 to 10 carbon atoms; $R_2$, $R_3$, and $R_4$ are the same or different monovalent aliphatic hydrocarbon residues of sufficient molecular weight that the silane is stable during preparation of the adhesive composition and yet do not prejudice hydrolysis of the silane under conditions of use of the adhesive composition. Preferably $R_2$, $R_3$, and $R_4$ each have 1 to 5 carbon atoms and more preferably each is a methyl or ethyl group. Preferably, X is a group capable of a chemical reaction by condensation (for example, with isocyanate groups), such as an epoxy, mercapto, amino, or hydroxyl group. Examples of suitable silanes include gamma-glycidoxy propyl trimethoxy silane, gamma amino propyl triethoxy silane, and N-beta (aminoethyl) gamma-aminopropyl-trimethoxysilane, with gamma-glycidoxy propyl trimethoxy silane being presently preferred. The alkoxy silane compound of the present invention is utilized in an amount ranging from about 0.1 to 10 percent, preferably 0.5 to 3 percent by weight of the first component.

The second component of the present invention is a cross-linking compound which cross-links or cures the first component of the invention. The cross-linking compound can essentially be any material which will effectively cure or cross-link the first component of the invention. The cross-linking compound is preferably a diisocyanate compound such as 2,4-toluene diisocyanate, diphenylmethane-4,4'-diisocyanate, p-phenylene diisocyanate, m-phenylene diisocyanate, 1,4-cyclohexyl diisocyanate, tetramethylxylyl diisocyanate and dimethyldiphenyl diisocyanate, with diphenylmethane-4,4'-diisocyanate being the preferred diisocyanate compound. The cross-linker is typically utilized in an amount from about 4 to about 32, preferably from about 8 to about 20 parts by weight per 100 parts by weight of the first component.

A solvent is required to dissolve the respective components. Solvents useful for dissolving the first component include polar or aromatic solvents such as methyl ethyl ketone, methyl isobutyl ketone, xylene and toluene, with methyl ethyl ketone and xylene being preferred. The solvent for the first component is utilized in an amount sufficient to provide a component having a total solids content (TSC) of from about 7 to about 50, preferably from about 15 to about 30 percent. A solvent, although not necessary, may be utilized to dissolve the second component of the invention. Typical solvents useful for dissolving the second component include halogenated solvents such as trichloroethylene, 1,1,1-trichloroethane and perchloroethylene with trichloroethylene being preferred. The solvent for the second component is utilized in an amount sufficient to provide a component having a total solids content of from about 1 to about 100, preferably from about 30 to about 60 percent.

The formulation of the present invention can optionally contain other well-known additives including plasticizers, fillers, pigments, reinforcing agents and the like, in amounts employed by those skilled in the art to obtain desired color and consistency.

The two components of the present invention must be stored separately in order to avoid any premature cross-linking or curing of the formulation. The adhesive of the invention is typically applied to a desired substrate by first mixing the first component and the second component together in the amounts described previously. After the initial mixing, the resulting formulation must be applied within at least about 30 days but preferably within about 2 days in order to avoid a premature increase in viscosity. Most preferably, the formulation is applied immediately after mixing the two components in order to avoid any increase in viscosity which might create problems associated with the corresponding application technique. The formulation may be applied to a desired substrate by techniques known in the art such as by brushing, spraying, or dipping the substrate with the formulation. Preferably, the formulation is applied by spraying or brushing.

In general, after applying the formulation and allowing it to dry for a period of between about 12 and 24 hours, the two surfaces to be bonded should be brought together under at least about 1 psi/sq. in. of pressure in order to create a permanent bond. No additional heating is required to effect the bonding.

When bonding vinyl polymers to various glass substrates, the vinyl polymer is typically applied to the surface of the substrate from an injection molding device according to techniques well-known in the art. A vinyl polymer applied from such a molding device typically has an initial temperature of from about 320° F. to about 350° F. and the coated substrate and vinyl polymer are brought together under a pressure of from about 500 to about 4000 psi, preferably from about 2000 to about 3000 psi. No additional heating of the coated substrate is required for the adhesive of the invention to sufficiently bond the vinyl polymer to the substrate. After the vinyl polymer and substrate are brought together, the elastomer-substrate assembly is allowed to cool for a period of from about 12 hours to about 24 hours in order to ensure sufficient cross-linking of the formulation. The vinyl polymer and the substrate may also be bonded according to other methods such as assembly bonding or extrusion.

Although the adhesive formulation of the present invention has shown exceptional bonding ability with vinyl polymers such as polyvinyl chloride, the adhesive may be utilized to bond any type of substrate to any type of material such as polyether esters, polyether amides, and thermoplastic polyurethanes. The substrates to which the vinyl polymers or other materials may be bonded include substrates such as metal, plastic, thermoplastic elastomers, leather, yarns, cords, and fabric. Various metals which may be bonded according to the present invention include any of the common structural metals such as iron, steel (including stainless steel), lead, aluminum, copper, brass, bronze, Monel metal, nickel, zinc, and the like. The adhesive formulation of the invention is preferably utilized to bond a vinyl halide polymer to a glass substrate. The formulation of the invention may also be utilized as a coating or as a primer for adhesive compositions for any surface or substrate.

The following examples are presented in order to further illustrate the invention but are not intended to limit in any manner the scope of the invention.

EXAMPLE 1

To 703 mls of methyl ethyl ketone is added 100 grams of a linear polyester polyurethane (DESMOCOLL 500 supplied by Mobay Corporation), and the mixture is stirred until the linear polyester polyurethane is totally dissolved. To 138 mls of xylene is added 30 grams of chlorinated polyisoprene, and the mixture is stirred until the halogenated polyolefin is totally dissolved. The polyurethane, polyolefin, and 1.5 grams of gamma-glycidoxy propyl trimethoxy silane are blended together in order to form the first component of the adhesive. To the first component is added 49.1 grams of 4,4-diphylmethane diisocyanate dissolved in trichloroethylene at a solids content of 50% by weight. The mixture is shaken on a paint shaker until a uniform mixture is achieved. The resulting formulation is applied to cleaned glass coupons by pouring the formulation over the coupons. The coated coupons are then dried in a fume hood to remove all of the solvents.

The coupons are then placed in an 8-cavity injection mold of an Injectamatic injection molding press available from Hydratecs, Inc. The molding press is operated with a nozzle temperature of 150° F., a screw barrel temperature of 400° F., a ram barrel temperature of 400° F., a top platen temperature of 150° F., and a clamp pressure of 3000 psi, and is operated on a cycle time of approximately 30 seconds. A polyvinyl chloride compound provided by Vista Chemical Company is injection molded into the cavities. After bonding and demolding the coupons, the coupons are allowed to cool for 24 hours before testing.

DESCRIPTION OF TESTS

Primary Adhesion per ASTM D429B

Parts are tested at room temperature with a 180 degree peel angle per ASTM D429B. Test speed is 2 inches per minute. Peel strength (pounds/linear inch or pli) and percent rubber retention are recorded.

100 Hours/176° F. Water Immersion

Parts are immersed in water for 100 hours at 176° F. After immersion, the parts dry overnight at ambient conditions. Testing occurs the following day at room temperature with a peel angle of 180 degrees. Test speed is 2 inches per minute. Peel strength (pli) and percent rubber retention are recorded.

180° F. Adhesion

Parts are heated to 180° F. for 15 minutes before testing. Testing occurs at 180° F. with a peel angle of 180 degrees. Test speed is 2 inches per minute. Peel strength (pli) and percent rubber retention are recorded.

The results of the tests as performed on coupons prepared as in Example 1 are described in Table 1 below. The designation Xpli YR indicates that the bond failed at X pli of force and retained Y percent of rubber on the coupon after bond failure.

TABLE 1

| Example | Prim. Adh. | Test Results 100 Hr./176 F. Water | 180 F. Adh. |
|---|---|---|---|
| 1 | 32 pli 62 R | 24 pli 27 R | 18 pli 51 R |

Since it is relatively difficult to bond vinyl chloride polymers to glass, a 62 percent rubber retention in the primary adhesion test above shows excellent bonding results for this type of system. The 27 and 51 percent rubber retention values are also excellent values for the water immersion and 180° F. tests in a vinyl chloride polymer-glass system.

The foregoing is a discussion and technical description of the preferred embodiments of the present invention. The true scope of the invention is defined by the following claims.

What is claimed is:

1. A chemical formulation comprising a linear polyester polyurethane, a halogenated polyolefin, an alkoxy silane compound, and a cross-linker.

2. A chemical formulation according to claim 1 wherein the urethane comprises the reaction product of an isocyanate-functional urethane polyester prepolymer and a low molecular weight chain extending diol present in an amount from about 10 to about 99 percent by weight based on the total amount of urethane, polyolefin and alkoxy silane compound.

3. A chemical formulation according to claim 1 wherein the halogenated polyolefin comprises chlorinated polyisoprene present in an amount from about 0.2 to about 60 percent by weight based on the total amount of urethane, polyolefin and alkoxy silane compound.

4. A chemical formulation according to claim 1 wherein the alkoxy silane compound corresponds to the formula:

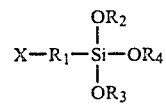

wherein $R_1$ is a divalent aliphatic hydrocarbon residue having 1 to 10 carbon atoms; $R_2$, $R_3$, and $R_4$ are the same or different monovalent aliphatic hydrocarbon residues; and X is an epoxy, mercapto, amino or hydroxyl group; and wherein the silane compound is present in an amount from about 0.1 to about 10 percent by weight based on the total amount of urethane, polyolefin and alkoxy silane compound.

5. A chemical formulation according to claim 1 wherein the cross-linker comprises diphenylmethane-4,4'-diisocyanate present in an amount from about 4 to about 32 parts by weight per 100 parts by weight of the total amount of urethane, polyolefin and alkoxy silane compound.

6. A chemical formulation according to claim 2 wherein the urethane is the reaction product of a linear polyester, toluene diisocyanate and 1,4-butane diol and is present in an amount from about 60 to about 80 percent by weight based on the total amount of urethane, polyolefin and alkoxy silane compound.

7. A chemical formulation according to claim 3 wherein the chlorinated polyisoprene is present in an amount from about 15 to about 30 percent by weight based on the total amount of urethane, polyolefin and alkoxy silane compound.

8. A chemical formulation according to claim 4 wherein the alkoxy silane compound is gamma-glycidoxy propyl trimethoxy silane and is present in an amount from about 0.5 to about 3 percent by weight based on the total amount of urethane, polyolefin and alkoxy silane compound.

9. A chemical formulation according to claim 5 wherein the cross-linker is present in an amount from about 8 to about 20 parts by weight per 100 parts by weight of the total amount of urethane, polyolefin and alkoxy silane compound.

10. A two-component adhesive for bonding polymer blend-based vinyl polymers wherein the first component comprises a linear polyester polyurethane, a halogenated polyolefin, and an alkoxy silane compound and wherein the second component comprises a cross-linker.

11. An adhesive according to claim 10 wherein the urethane is the reaction product of a linear polyester, toluene diisocyanate and 1,4-butane diol and is present in an amount from about 60 to about 80 percent by weight of the first component.

12. An adhesive according to claim 10 wherein the halogenated polyolefin is chlorinated polyisoprene and is present in an amount from about 15 to about 30 percent by weight of the first component.

13. An adhesive according to claim 10 wherein the alkoxy silane compound is gamma-glycidoxy propyl trimethoxy silane and is present in an amount from about 0.5 to about 3 percent by weight of the first component.

14. An adhesive according to claim 10 wherein the cross-linker is diphenylmethane-4,4'-diisocyanate and is present in an amount from about 8 to about 20 parts by weight per 100 parts by weight of the first component.

15. A method for bonding a glass substrate to a vinyl polymer comprising the steps of mixing a first component and a second component of an adhesive formulation together and then applying the mixed formulation to the surface of the substrate and applying the vinyl polymer to the coated surface of the substrate under a pressure of from about 500 to about 4000 psi at a temperature of from about 320° to about 350° F. and allowing the resulting polymer-to-substrate assembly to cool for a period from about 12 to about 24 hours wherein the first component comprises (1) a linear polyester polyurethane prepared by reacting an isocyanate-functional urethane polyester prepolymer with a low molecular weight chain extending diol and which is present in an amount from about 10 to about 99 percent by weight of the first component; (2) chlorinated polyisoprene present in an amount from about 0.2 to about 60 percent by weight of the first component; and (3) an alkoxy silane compound present in an amount from about 0.1 to about 10 percent by weight of the first component; and wherein the second component comprises diphenylmethane-4,4'-diisocyanate present in an amount from about 4 to about 32 parts by weight per 100 parts by weight of the first component.

16. A method according to claim 15 wherein the urethane is the reaction product of a linear polyester, toluene diisocyanate and 1,4-butane diol and is present in an amount from about 60 to about 80 percent by weight of the first component; the chlorinated polyisoprene is present in an amount from about 15 to about 30 percent by weight of the first component; and the alkoxy silane compound is gamma-glycidoxy propyl trimethoxy silane and is present in an amount from about 0.5 to about 3 percent by weight of the first component; and wherein the diphenylmethane-4,4'-diisocyanate is present in an amount from about 8 to about 20 parts by weight per 100 parts by weight of the first component.

17. A vinyl polymer-glass assembly prepared by mixing a first component and a second component of an adhesive formulation together and then applying the mixed formulation to the surface of a glass substrate and applying the vinyl polymer to the surface of the substrate under a pressure of from about 500 to about 4000 psi at a temperature of from about 320° to about 350° F. and allowing the resulting vinyl polymer-glass assembly cool for a period from about 12 to about 24 hours wherein the first component comprises (1) a linear polyester polyurethane prepared by reacting an isocyanate-functional urethane polyester prepolymer with a low molecular weight chain extending diol and which is present in an amount from about 10 to about 99 percent by weight of the first component; (2) chlorinated polyisoprene present in an amount from about 0.2 to about 60 percent by weight of the first component; and (3) an alkoxy silane compound present in an amount from about 0.1 to about 10 percent by weight of the first component; and wherein the second component comprises diphenylmethane-4,4'-diisocyanate present in an amount from about 4 to about 32 parts by weight per 100 parts by weight of the first component.

18. A vinyl polymer-glass assembly according to claim 17 wherein the urethane is the reaction product of a linear polyester, toluene diisocyanate and 1,4-butane diol and is present in an amount from about 60 to about 80 percent by weight of the first component; the chlorinated polyisoprene is present in an amount from about 15 to about 30 percent by weight of the first component; and the alkoxy silane compound is gamma-glycidoxy propyl trimethoxy silane and is present in an amount from about 0.5 to about 3 percent by weight of the first component; and wherein the diphenylmethane-4,4'-diisocyanate is present in an amount from about 8 to about 20 parts by weight per 100 parts by weight of the first component.

* * * * *